(12) United States Patent
Chirila et al.

(10) Patent No.: US 8,339,807 B2
(45) Date of Patent: Dec. 25, 2012

(54) EM SHIELD FOR INTERNAL ANTENNA OF HANDHELD TERMINALS

(75) Inventors: Laurian Petru Chirila, Irvine, CA (US); Iain Campbell Roy, Mississauga (CA)

(73) Assignee: Psion Teklogix Inc., Ontario (CA)

( * ) Notice: Subject to any disclaimer, the term of this patent is extended or adjusted under 35 U.S.C. 154(b) by 309 days.

(21) Appl. No.: 12/766,066

(22) Filed: Apr. 23, 2010

(65) Prior Publication Data

US 2011/0261551 A1 Oct. 27, 2011

(51) Int. Cl.
*H05K 9/00* (2006.01)
(52) U.S. Cl. ......................................................... 361/818
(58) Field of Classification Search .................. 361/730, 361/760, 764, 800, 816–818
See application file for complete search history.

(56) References Cited

U.S. PATENT DOCUMENTS 8,125,788 B2 * 2/2012 Hatanaka et al. ............. 361/764
8,131,327 B2 * 3/2012 Oshima et al. ............. 455/575.1

* cited by examiner

*Primary Examiner* — Jeremy Norris
*Assistant Examiner* — Tremesha S Willis
(74) *Attorney, Agent, or Firm* — Occhiuti Rohlicek & Tsao LLP (57) ABSTRACT

A portable terminal has a first enclosure of a housing having a first interior to contain a plurality of electronic components and a ground. The terminal has a second enclosure of the housing for coupling to the first enclosure, the second enclosure having a second interior to contain an antenna and for facilitating at least one of receiving or transmitting of electromagnetic (EM) signals between the antenna and an environment external to the second enclosure. The terminal has an EM shield positioned at an interface between the first interior and the second interior, the EM shield including electrically conductive material to absorb EM radiation generated by the plurality of electronic components. Also included is an electrically conductive coupling to couple the EM shield to the ground of the first enclosure.

16 Claims, 7 Drawing Sheets

EM SHIELD FOR INTERNAL ANTENNA OF HANDHELD TERMINALS

The present invention relates to electromagnetic shielding of antennas.

BACKGROUND

Cellular communication systems continue to grow in popularity and have become an integral part of both personal and business communications. Cellular telephones allow users to place and receive phone calls most anywhere they travel. Moreover, as cellular telephone technology is increased, so too has the functionality of cellular devices. For example, many cellular devices now incorporate Personal Digital Assistant (PDA) features such as calendars, address books, task lists, calculators, memo and writing programs, etc. These multi-function devices usually allow users to send and receive electronic mail (email) messages wirelessly and access the internet via a cellular network and/or a wireless local area network (WLAN), for example.

As the functionality of cellular communications devices continues to increase, so too does demand for smaller devices that are easier and more convenient for users to carry. The circuit boards and associated electronic components thereon are becoming increasingly reduced in size and placed closer together. These components include antennae, RF components/power amplifiers, antenna switches, and other electronic components that pick up conductive energy and create interference within various circuits and components. For example, some components could pick up conducted energy directly from a power amplifier circuit, the charging contacts of a battery, antenna contacts, or from the radiated energy emitted by an antenna. This unwanted reception of conducted or near field radiated energy from power amplifiers, antennae or other components is particularly problematic in a packet burst transmission as part of a Global System for Mobile communications (GSM) system, including the 850 MHz, 900 MHz, 1800 MHz and 1900 MHz frequency bands. Other issues arise with modulation schemes that use In-phase (I) and Quadrature (Q) circuits, creating linearity issues with power amplifiers and poor antenna match. This can cause degradation of TRP (total radiated power) and raise harmonic interference issues because of the higher non-linearity of a power amplifier as an example.

Electromagnetic interference (or EMI, also called radio frequency interference or RFI) is a disturbance that affects an electrical circuit due to either electromagnetic conduction or electromagnetic radiation emitted from an external source. The disturbance may interrupt, obstruct, or otherwise degrade or limit the effective performance of the circuit. In the case of a handheld computer, performance of the antenna of the handheld can be compromised or otherwise affected (including tenability of the antenna) due to EM radiation generated by other electronic components of the handheld acting as the external source.

Accordingly, one disadvantage with today's compact handheld devices is that the close proximity of the antenna other electronic components can affect the antenna performance (e.g. gain, tuning, etc.). A further disadvantage of today's handhelds is that they have a greater likelihood of damage due to impact/dropping of the handheld by the user and therefore electrical connectivity within the handheld can be subjected to periodic interruption.

SUMMARY

There is a need for a improved portable terminal that overcomes or otherwise mitigates at least one of the above discussed disadvantages.

One disadvantage with today's compact handheld devices is that the close proximity of the antenna other electronic components can affect the antenna performance (e.g. gain, tuning, etc.). A further disadvantage of today's handhelds is that they have a greater likelihood of damage due to impact/dropping of the handheld by the user and therefore electrical connectivity within the handheld can be subjected to periodic interruption. Contrary to current handheld configurations, there is provided a portable terminal having a plurality of electronic components and an antenna such that at least a portion of the plurality of electronic components and the antenna are housed internally by a housing. The terminal comprising a first enclosure of the housing having a first interior to contain the plurality of electronic components and a ground. The terminal has a second enclosure of the housing for coupling to the first enclosure, the second enclosure having a second interior to contain the antenna and for facilitating at least one of receiving or transmitting of EM signals between the antenna and an environment external to the second enclosure. The terminal has an electromagnetic (EM) shield positioned at an interface between the first interior and the second interior, the EM shield including electrically conductive material to absorb EM radiation generated by the plurality of electronic components being directed towards the antenna and to convert at least a portion of the absorbed EM radiation into electrical current and direct the electrical current towards the ground of the first enclosure. Also included is an electrically conductive coupling to couple the EM shield to the ground of the first enclosure.

A first aspect provided is a portable terminal having a plurality of electronic components and an antenna such that at least a portion of the plurality of electronic components and the antenna are housed internally by a housing, the terminal comprising: a first enclosure of the housing having a first interior to contain the plurality of electronic components and a ground; a second enclosure of the housing for coupling to the first enclosure, the second enclosure having a second interior to contain the antenna and for facilitating at least one of receiving or transmitting of EM signals between the antenna and an environment external to the second enclosure; an electromagnetic (EM) shield positioned at an interface between the first interior and the second interior, the EM shield including electrically conductive material to absorb EM radiation generated by the plurality of electronic components being directed towards the antenna and to convert at least a portion of the absorbed EM radiation into electrical current and direct the electrical current towards the ground of the first enclosure; and an electrically conductive coupling to couple the EM shield to the ground of the first enclosure.

A second aspect is a method for assembling a portable terminal having a plurality of electronic components and an antenna such that at least a portion of the plurality of electronic components and the antenna are housed internally by a housing, the method comprising the steps of: installing the plurality of electronic components in a first interior of a first enclosure of the housing, the first enclosure having a ground; installing the antenna in a second interior of a second enclosure of the housing, the second enclosure for facilitating at least one of receiving or transmitting of EM signals between the antenna and an environment external to the second enclosure; positioning an electromagnetic (EM) shield at an interface between the first interior and the second interior, the EM shield including electrically conductive material to absorb EM radiation generated by the plurality of electronic components being directed towards the antenna and to convert at least a portion of the absorbed EM radiation into electrical current and direct the electrical current towards the ground of the first enclosure; attaching an electrically conductive coupling to the EM shield for coupling the EM shield to the ground of the first enclosure; and fastening the second enclosure and the first enclosure to one another.

BRIEF DESCRIPTION OF THE DRAWINGS

These and other features of the invention will become more apparent in the following detailed description in which reference is made to the appended drawings by way of example only, wherein.

DESCRIPTION

Portable Terminal 8

Figure 1:
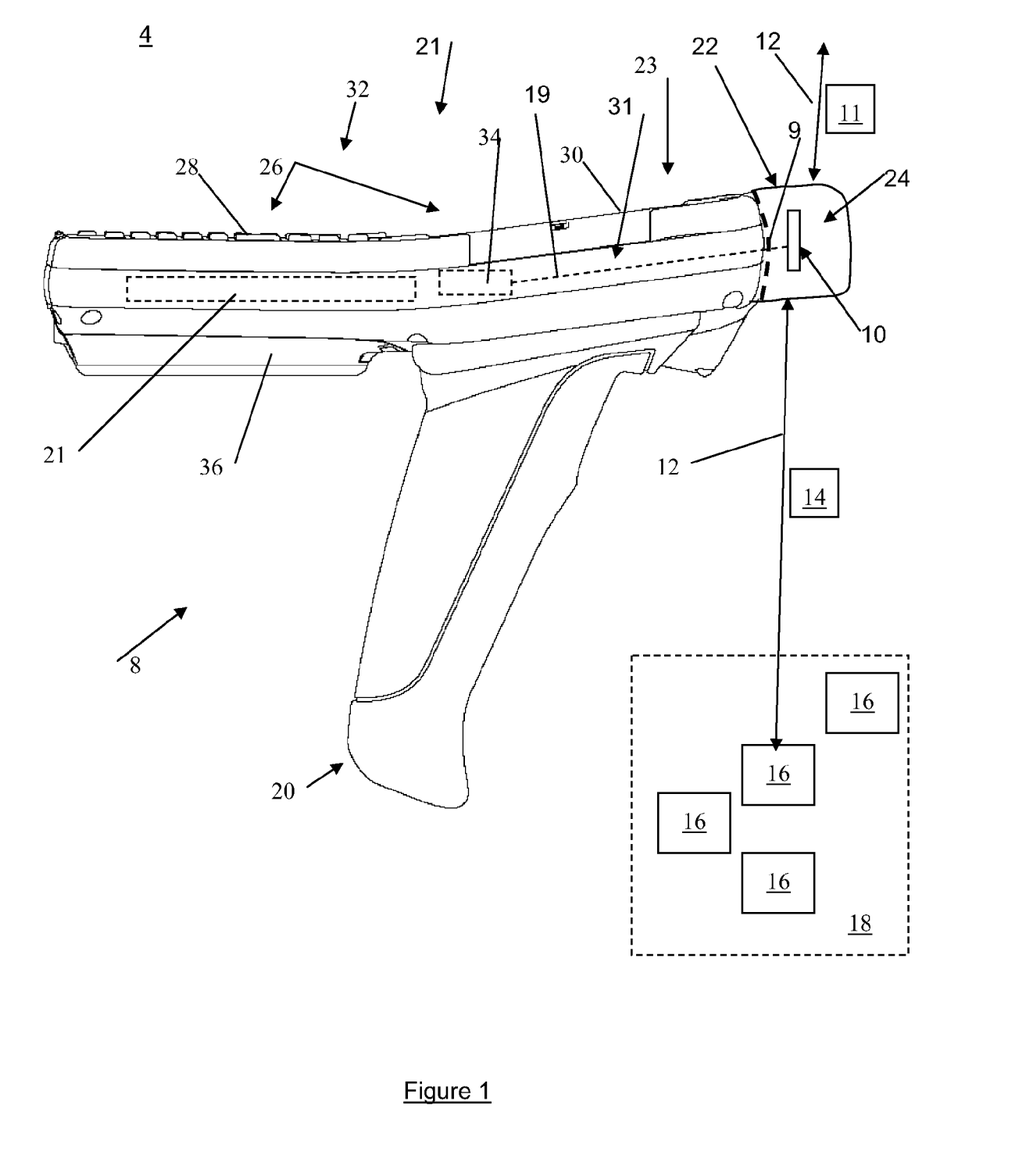
FIG. 1 is a side view of a housing of a portable terminal.
Figure 2:
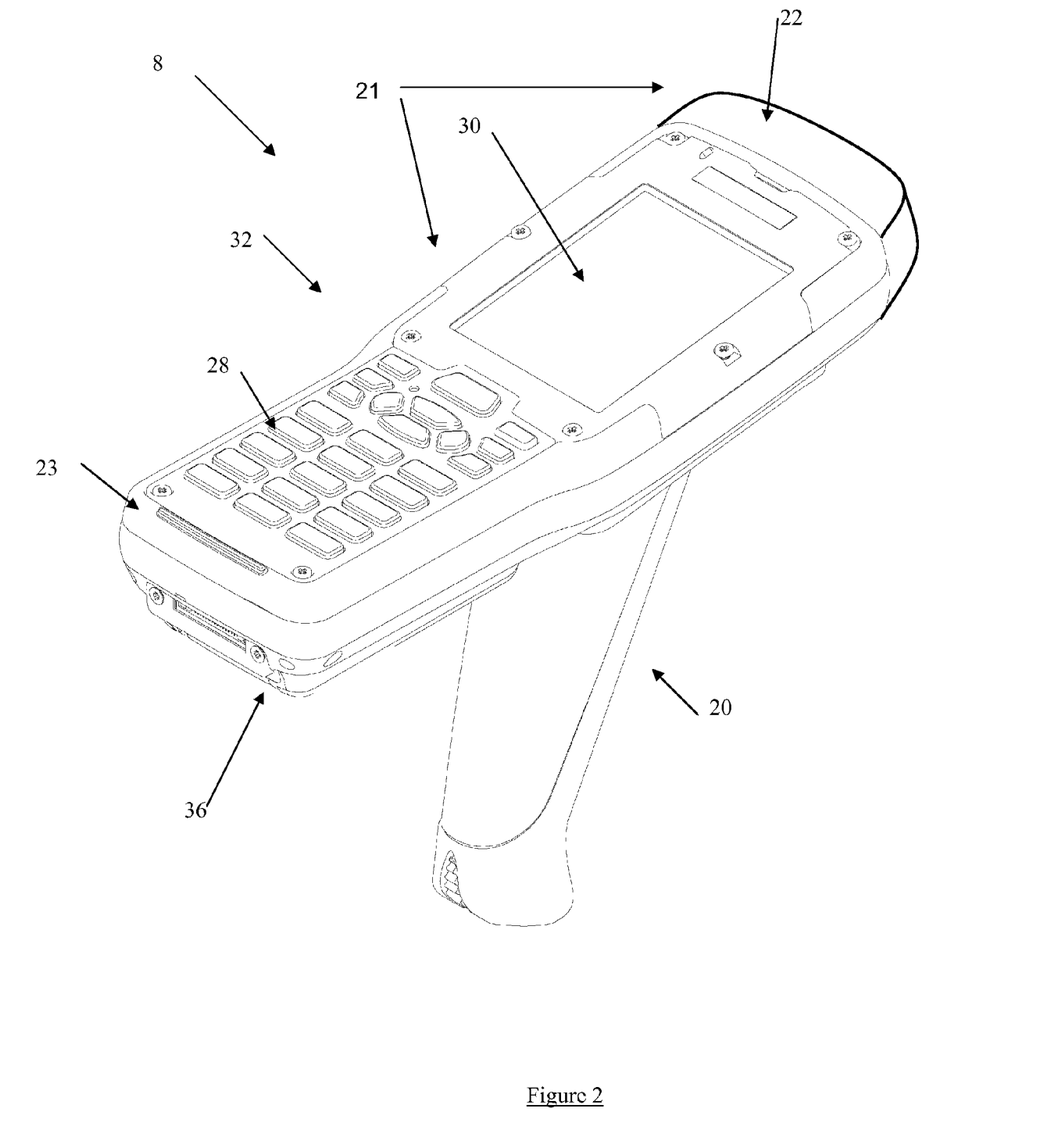
FIG. 2 is a perspective view of the housing of the portable terminal of FIG. 1.

Referring to FIGS. 1 and 2, shown is a portable terminal 8 for interacting via an antenna 10 (or other scanning device 10) via electromagnetic radiation 12 used for imaging/scanning features (and/or functions) in data capture/communications 14 and data communications 11 via wireless connection to a telecommunications network (not shown). In terms of data capture/communications 14, the electromagnetic radiation 12 can be used for asset tracking/management in connection with the scanner 10, for example in wireless communication 14 with tracking (e.g. information) objects 16 (e.g. barcode labels and/or RFID tags) present in one or more logistics environments 18 (e.g. industrial, retail, supply chain). It is recognised that the tracking objects 16 can be attached to products that are being transported from one location to another in the logistics environment 18. Examples of these environments 18 can include such as but not limited to: front store retail and/or warehousing for mobile stock checking, price checking, and merchandising; and utilities for meter reading, surveying, parking enforcement, and asset tracking. In terms of telecommunications 11, the antenna 10 can be an antenna type such as but not limited to WAN, WiFi, and/or Bluetooth, GPS communication technologies. It is also recognized that the handheld 8 can be embodied as a generic mobile device such as a mobile communication device, the handheld as described, or a body-worn personal communication device, for example.

The portable terminal 8 has an enclosure/housing 23 having a first interior 31 for housing (completely or at least partially within) a plurality of electronic components 32 and a secondary enclosure 22 (coupled to the primary enclosure 23) for housing the antenna 10. It is recognised that the antenna 10 can be completely enclosed (e.g. an internal antenna 10) in an interior 24 of the secondary enclosure 22 or can be partially enclosed in the interior 24, as desired. The portable terminal 8 also has an electromagnetic (EM) shield 9 positioned between the first interior 31 and the second interior 24 for inhibiting electromagnetic interference (EMI) between the antenna 10 and the electrical components 32, as further described below. The EM shield 9 is configured for facilitating EM isolation for the antenna 10 from adjacent interfering components 32. It is recognised that the EM shield can be embodied as a rigid plate, a flexible plate, or other physical shape for positioning between the interiors 31,24.

The portable terminal 8 can have an optional handle 20, connected via a release securable connection, to the enclosure 23 (e.g. housing) of the portable terminal 8. It is also recognised that the handle 20 may be permanently or otherwise fixedly attached (e.g. not releasable) to the enclosure 23 by fastening means. Further, it is recognised that the handle 20 may be formed (e.g. molded) as integral to at least a portion of the enclosure 23. It is recognised that in the description, the terms "housing" and "enclosure" can be used interchangeably.

The portable terminal 8 therefore has a number of the electronic components 32 housed partially or completely within the enclosure 23, such as but not limited to: a user interface 26, including a keyboard 28 and a display 30 (e.g. touch screen); one or more onboard processors 21, and a scanner/radio communications module 34 (e.g. laser, WLAN with VoIP and Bluetooth, imager used as a receiver/transmitter of the antenna 10 as coupled via a feed line 19) for facilitating the wireless communications 11,14. The portable terminal 8 can also have an onboard power source 36 for helping to satisfy power requirements of the onboard processor(s) 21, the user interface 26, and the communications module 34. It is recognised that the feed line 19 can be positioned between the interiors 24,31 through one or more hole(s)/slot(s) 7 in the EM shield 9 (FIG. 3), as further described below.

Figure 3:
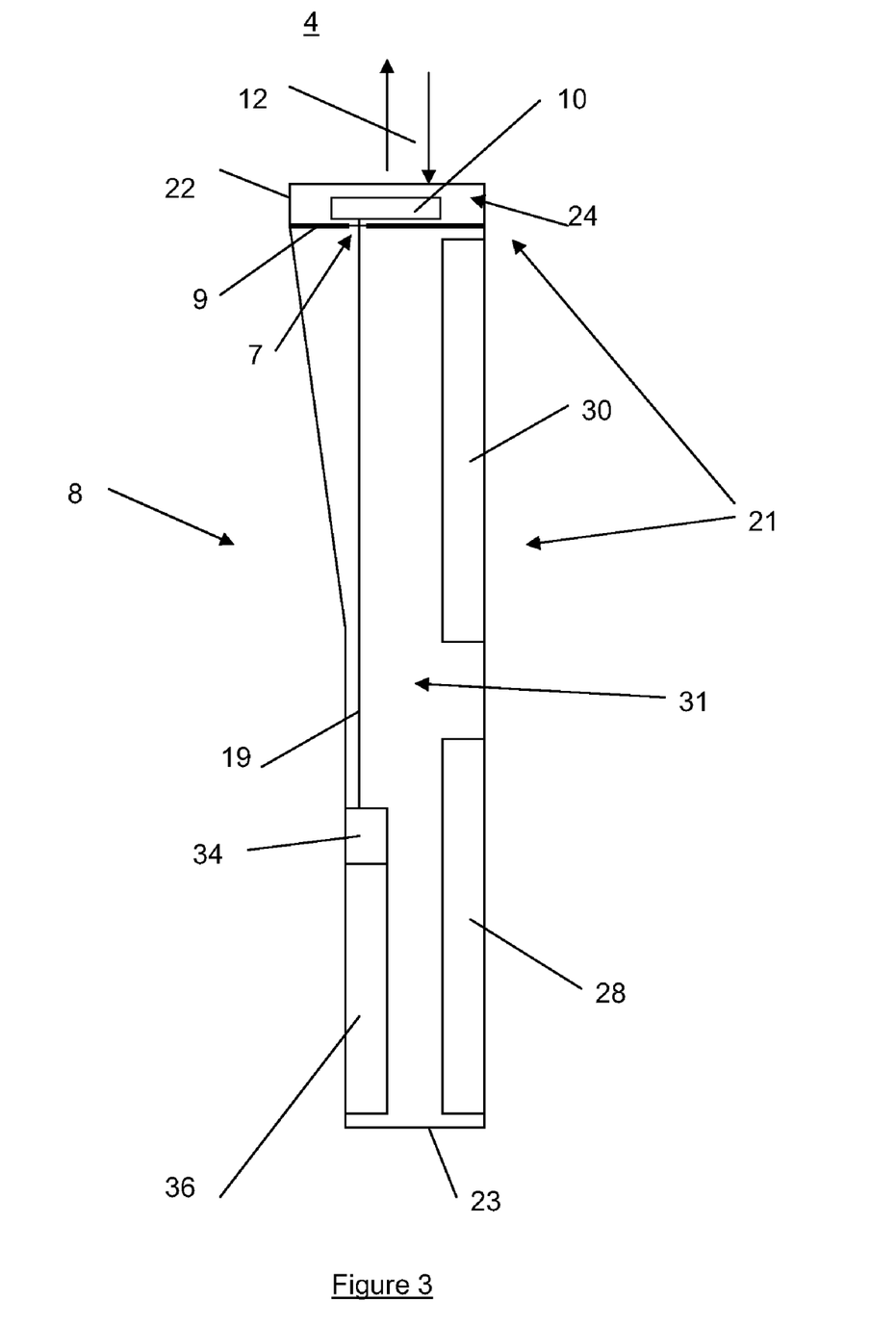
FIG. 3 is cross sectional view of a further embodiment of housing of the portable terminal of FIG. 1.
Figure 8:
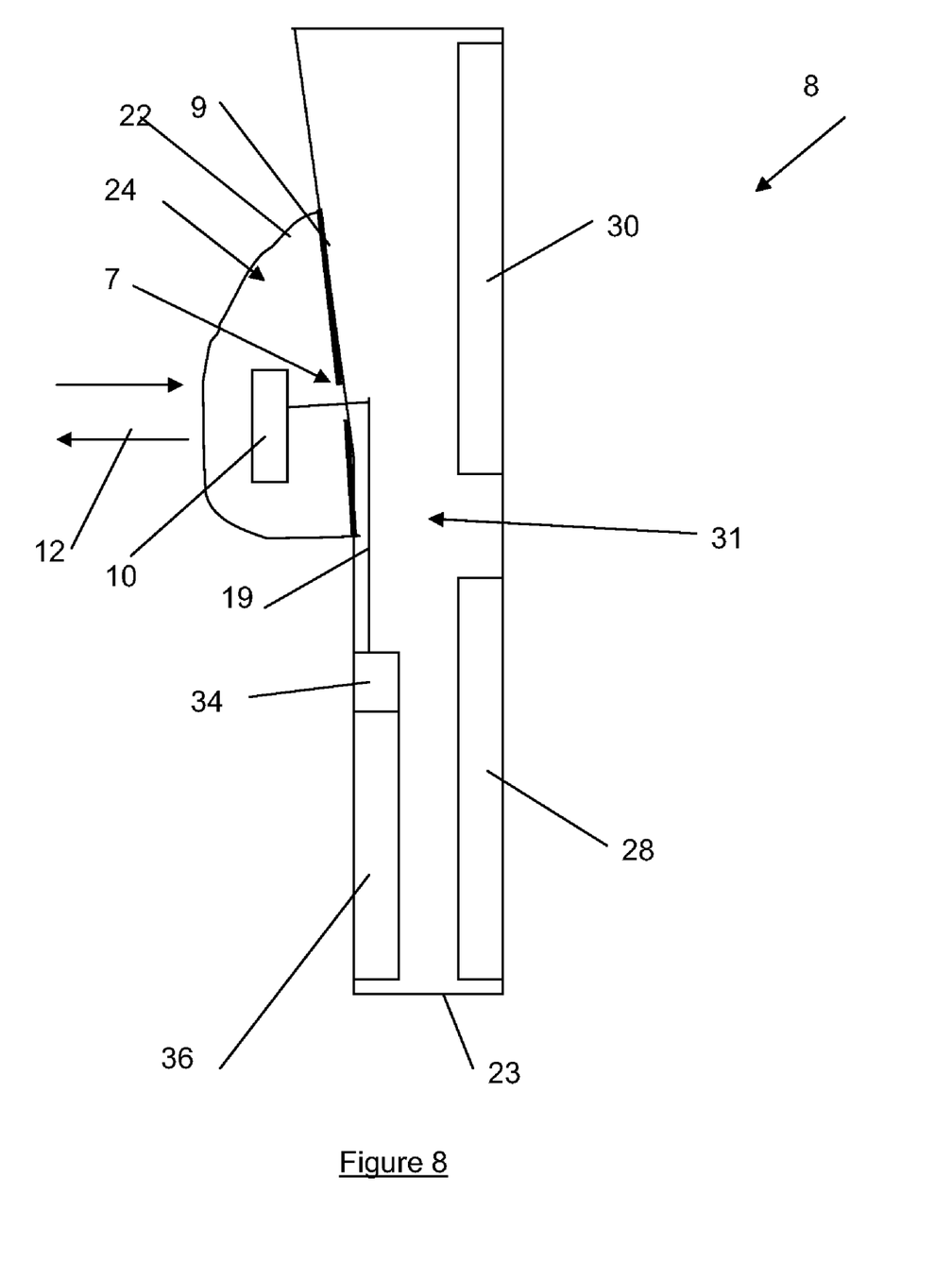
FIG. 8 is cross sectional view of a further embodiment of housing of the portable terminal of FIG. 1.

Referring to FIG. 3, the antenna 10 can have a physical form factor to make it possible to embed (i.e. into the interior 24 of the handheld terminal 8). The handheld terminal 8 can have the antenna 10 coupled via line 19 to a transceiver 34 (for example as a transmitter only for transmitting, a receiver only for receiving or combined as the transceiver for both transmission and reception of the waves 12) and to the battery 36, which are housed at lease partially in the main housing 23 of the handheld 8 (e.g. in the housing 23 also containing the display 30 and/or keyboard 28). For example, the enclosure 22 can be positioned on the end of the handheld 8 as an endcap adjacent to the display 104 and/or the keypad 102. It is also recognised that the enclosure 22 can be positioned on a backside of the enclosure 23 opposite the display 104 and/or the keypad 102 (see FIG. 8). It is recognised that the antenna 10 can be configured to function as a WAN, WIFI and/or Bluetooth communication technologies antenna 10 (e.g. non-directional based antennas), and/or as a directional antenna 10 (e.g. RFID scanner).

Ground 5 of Housing 23

In the portable terminal 8, the term ground 5 (e.g. chassis ground) is used for the reference point for the electrical circuits (i.e. of the electrical components 32) from which other voltages are measured, or a common return path for electric current. A connection to ground 5 can limit the voltage built up between the electronic circuits and the ground 5, protecting circuit insulation from damage due to excessive/stray voltage. Further, connections to ground 5 can limit the build-up of static electricity within/between electronic components 32 of the portable terminal 8.

For measurement purposes, the ground 5 of the portable terminal 8 is provided with respect to the housing 23 as a constant potential reference against which other potentials can be measured. The ground 5 system has an appropriate current-carrying capability in order to serve as an adequate zero-voltage reference level. It is recognised that the term ground 5 for the portable device 8 is similar to the use of the term ground for electrical and electronics applications in vehicles such as ships, aircraft, and spacecraft that have a "ground" connection without any actual connection to the Earth.

It is also recognised that electrical connections to the ground 5 of the housing 23 can be used as a reference potential for radio frequency signals for the antenna 10 located in the secondary housing 22. Because high frequency signals 12 can flow to earth through capacitance, capacitance to ground 5 can provide for effectiveness of signal grounds 5. For example, an ideal signal ground 5 maintains a constant reference (e.g. zero) voltage regardless of how much electrical current flows into ground 5 or out of ground 5. It is also recognised that resistance at the signal 12 frequency of the ground 5 connection (e.g. for the feed line 19) can influence the signals 12 quality. Accordingly, it is recognised that all electrical circuits of the electronic components 32 as well as the metal shield 9 can be interconnected to the ground 5 provided in the housing 23. Signal grounds 5 can serve as return paths for signals and power within the equipment of the portable terminal 8, and on the signal interconnections between equipment. The electronic design of the ground 5 of the housing 23 and the electrical components 32 can feature a single return that acts as a reference for all signals. Power and signal grounds 5 can be connected together (e.g. through the metal case and/or metal conductors—e.g. metal wires/plates of the housing 23).

Accordingly, voltage is a differential quantity and to measure the voltage of a single point in the electronic circuits of the electrical components 32, the ground 5 provides a reference point to measure against. This common reference point is called ground 5 and considered to have the reference voltage (e.g. zero voltage). This signal ground 5 may or may not actually be connected to the power ground 5 (e.g. the neutral terminal of the battery 36). A system where the system ground 5 is not actually connected to another circuit (though there may still be AC coupling) can be referred to as a floating ground 5. In any event, it is recognised that the EM shield 9 is connected to the ground 5 provided by the housing 23, so as to collect and distribute to ground 5 any EM radiation 101 absorbed by the EM shield 9 (i.e. received from the electronic components 32 and/or the antenna 10). One advantage of the EM shield 9 is the provision of the electronic components 32 of the portable terminal 8 as EM isolated or otherwise providing a consistent EM reference as seen by the antenna 10 in the enclosure 22, thereby facilitating consistent tuning and operational environments for swapped antennas 10 (i.e. one of a number of different antenna 10 configurations potentially mounted in the enclosure 22 on the other side of the EM shield 9 from the electronic components 32).

Antenna 10

Referring to FIG. 1, the antenna 10 (or aerial) can be defined as a transducer designed to transmit and/or receive electromagnetic waves 12 from a surrounding environment 4. Accordingly, antennas 10 convert electromagnetic waves 12 into electrical currents (e.g. receive operation) and convert electrical currents into electromagnetic waves 12 (e.g. transmit operation), such that the electrical current is communicated via a transmission line/cable/lead 19 coupled between the antenna 10 and a current source/sink (i.e. receiver, transmitter, or transceiver 32). Antennas 10 can be used in systems such as radio and television broadcasting, point-to-point radio communication, wireless LAN, radar, product tracking and/or monitoring via Radio-frequency identification (RFID) applications, and space exploration. The antenna 10 is incorporated into the computing device 8 such as portable handheld device (e.g. an RFID reader) acting as the current source/sink.

Radio frequency (RF) radiation 12 is a subset of electromagnetic radiation 12 with a wavelength of 100 km to 1 mm, which is a frequency of 300 Hz to 3000 GHz, respectively. This range of electromagnetic radiation 12 constitutes the radio spectrum and corresponds to the frequency of alternating current electrical signals used to produce and detect radio waves 12 in the surrounding environment. Ultra high frequency (UHF) designates a range of electromagnetic waves 12 with frequencies between 300 MHz and 3 GHz (3,000 MHz), also known as the decimeter band or decimeter wave as the wavelengths range from one to ten decimeters (10 cm to 1 meter). For example, RF can refer to electromagnetic oscillations in either electrical circuits or radiation through air and space. Like other subsets of electromagnetic radiation, RF travels at the speed of light. It is also recognised that the radio waves 12 can be detected and/or generated by the antenna 10 in frequency ranges other than in the UHF band, such as but not limited to a plurality of frequency sub-bands (e.g. dual/multi-band 3G/4G applications such as UMTS or CDMA or WiMAX or WiFi in which there are multiple so-called frequency bands—for example 700/850/900 MHz and 1800/1900/2100 MHz within two major low and high wavelength super bands). Accordingly, it is recognised that the antenna 10 described herein is not limited to UHF RFID applications and could readily be applied to any radio communication technology at UHF frequencies or higher frequencies (e.g. WAN, WIFI, Bluetooth, GPS and/or other).

It is recognised that the antenna 10 operates as radiating surface for impinging electromagnetic radiation 12 coming from or going to the active antenna 10. It is recognised that the active/radiative element of the antenna 10 is not connected to the ground Sand is instead electrically insulated from the ground 5.

Transmission Line/Cable 19

As shown in FIG. 1, the transmission (e.g. feed) line 19 in a radio transmission, reception or transceiver system is the physical cabling 19 that carries the RF signal to and/or from the antenna 10. The feed line 19 carries the RF energy for transmission and/or as received with respect to the antenna 10. There are different types of feed lines 19 in use in modern wireless antenna 10 systems, lines 19 such as but not limited to: the coaxial type, the twin-lead, and, at frequencies above 1 GHz, a waveguide. For example, the coaxial cable 19 is a rounded cable with a center conductor and a braided or solid metallic shield, usually copper or aluminum. The center conductor is separated from the outer shield by an insulator material, such that the center conductor is connected to the antenna 10 and the braided/solid metallic shield is connected to a ground plane (not shown) of the antenna 10 and/or to the ground 5 of the portable terminal 8.

Electrical Components 32

Referring to FIG. 1, the electrical components 32 of the portable terminal 8 can be components such as but not limited to: a main logic board (MLB) or other printed circuit board(s) (PCB); radio modules such s receivers/transmitters/transceivers for coupling to the antenna 10; UI devices 32 (e.g. keypad 28, display 30) and memory devices. For example, the MLB is the central printed circuit board (PCB) that, like a backplane, provides the electrical connections by which the other electrical components of the portable terminal 8 communicate and hosts the central processing unit and other subsystems housed in the housing 23. The MLB can also contain a chipset which forms an interface between the CPU's front-side bus, main memory, and peripheral buses, non-volatile memory chips (usually Flash ROM in modern motherboards) containing the portable terminals 8 firmware or BIOS, a clock generator which produces the system clock signal to synchronize the various components, and/or slots for expansion ports that can be interfaced via the buses supported by the chipset. A radio receiver/transmitter/transceiver 34 is one of the electrical components 32 that is connected to the antenna 10 via the feed line 19. The radio receiver/transmitter/transceiver 34 is an electronic circuit that receives and/or transmits its input/output from/to the antenna 10 via the feed line 19, uses electronic filters to separate any wanted radio signal 12 from all other signals 12 picked up by the antenna 10, amplifies the signals 12 to a level suitable for further processing, and finally converts through demodulation and decoding the signal into a form usable for the user of the portable terminal 8, such as sound (e.g. voice), pictures, digital data, measurement values, and/or navigational positions (e.g. GPS values).

Figure 4:
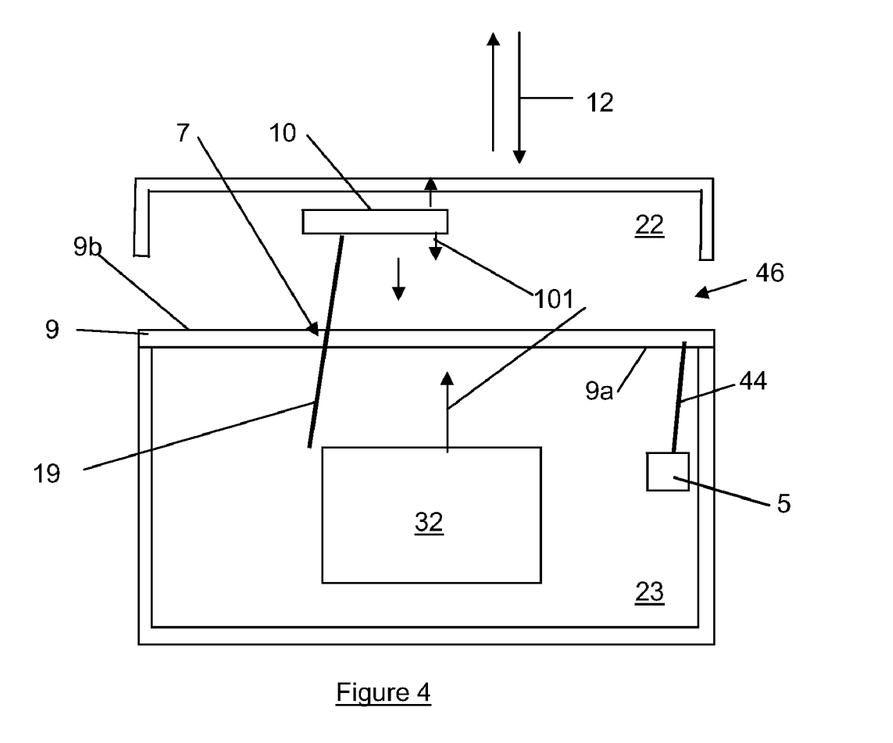
FIG. 4 is a further embodiment of the housing of FIG. 3.

Referring to FIG. 4, it is recognised that all of the electronic components 32 housed by the housing 23 of the portable terminal 8 can emit electromagnetic (EM) radiation 101 via operation of their electronic circuitry towards the antenna 10 and/or the operation of their electronic circuitry can be affected by any EM radiation 101 emitted towards the electronic components 32 by the antenna 10 housed by the enclosure 22. The purpose of the EM shield 9 is to inhibit (or otherwise reduce) the propagation of the EM radiation 101 from the enclosure 23 into the enclosure 22 and/or the propagation of the EM radiation 101 from the enclosure 22 into the enclosure 23. Accordingly, it is recognised that any EM radiation 101 present in an enclosure 23,22 that is different from the enclosure 23,22 from which the EM radiation 101 originated would be considered as electromagnetic interference (EMI) for the antenna 10 or electrical components 32 present in the respective enclosure 22,23.

Further to the above, it is recognised that the opening/entrance 6 of the enclosure 22 may be open or may be closed/covered prior to positioning of the EM shield 9. It is also recognised that the opening/entrance 6 of the enclosure 23 may be open or may be closed/covered prior to positioning of the EM shield 9.

EM/EMI Radiation 101

Electromagnetic interference (or EMI, also called radio frequency interference or RFI) is a disturbance that affects an electrical circuit operation (e.g. of the electrical components 32 or antenna 10) due to either electromagnetic conduction or electromagnetic radiation emitted from an external source (i.e. one that is outside of the respective enclosure 23,24). The disturbance may interrupt, obstruct, or otherwise degrade or limit the effective performance of the circuit. The source may be any object, artificial or natural, that carries rapidly changing electrical currents, such as an electrical circuit of the electrical components 32 of the radiative elements of the antenna 10.

Electromagnetic radiation 101 is a phenomenon that takes the form of self-propagating waves in a medium. Electromagnetic radiation 101 consists of electric and magnetic field components which oscillate in phase perpendicular to each other and perpendicular to the direction of energy propagation. When undesirably present in a different enclosure 23,24 from which it originated, the EMI radiation 101 carries energy and momentum that may be imparted to the electrical components 32 or antenna 10 with which it interacts, thus providing undesirable operation of the affected electrical components 32 or antenna 10. Accordingly, it is the purpose of the EM shield 9 to inhibit or otherwise reduce the amount out EMI 101 present in the enclosure 23, the enclosure 24, or both the enclosures 23,24, as desired. For example, the EM shield 9 can be configured to mask or otherwise isolate the operation of the antenna 10 form any EMI 101 from the electrical components 32, thus providing for a relatively consistent EM isolation of the antenna 10 from the electrical components 32 that be advantageous for tuning characteristics of the antenna 10. In other words, the presence of the EM shield 9 would provide for inhibited or otherwise reduced influence of the operation of the electrical components 32 on the tuning characteristics of the antenna 10 when positioned/installed in the interior 24 of the enclosure 22.

EM Shield 9

Referring to FIG. 4, it is recognized that the ground 5 of the housing 23 (e.g. as materially part of or otherwise enclosed in the interior 22) provides a reference point to measure against for operation of the electronic components 32 and the antenna 10. This common reference point is called the ground 5 and considered to have the reference voltage (e.g. zero voltage). This signal ground 5 may or may not actually be connected to the power ground 5 (e.g. the neutral terminal of the battery 36). In any event, it is recognised that the EM shield 9 is connected via connection 44 to the ground 5 provided by the housing 23, so as to collect and distribute to ground 5 any EM radiation 101 absorbed by the EM shield 9 (i.e. received from the electronic components 32 and/or antenna 10).

According, when EM radiation 101 impinges upon the conductive EM shield 9, the EM radiation 101 is absorbed by the conductive material of the EM shield 9 (e.g. the EM radiation 101 couples to the EM shield 9), travels/propagates along it, and induces an electric current in the conductive material by exciting the electrons of the conducting material of the EM shield 9. Therefore, the EM shield 9 acts as a conductor to conduct current flow (generated as a result of interaction with the EM radiation 101 impinging on the surface 9a of the EM shield 9) towards the ground 5 for conversion of the electromagnetic radiation 101 from the electronic components 32 and therefore away from the antenna 10 in the interior 24 of the enclosure 22.

The absorbed EM radiation 101 may also cause certain molecules of the conductive material to absorb energy and thus to heat up, rather than to generate electric current. EM radiation 101 waves originating from the electronic components 32 can also be redirected (e.g. reflected or scattered) by the surface 9a of the EM shield 9 in a direction away from the enclosure 24 for the antenna 10, in which case their energy of the EM radiation 101 waves is redirected or redistributed as well away from the antenna 10. Accordingly, it is recognised that the material of the EM shield 9 can also have some heat generation properties such that some of the absorbed EM radiation 101 (e.g. radio frequencies emanating from electronic components 32 such as the printed circuit boards) is soaked up and converted to heat energy. Accordingly, it is recognised that the material of the EM shield 9 can also have some EM radiation 101 reflectance properties such that some of the absorbed EM radiation 101 (e.g. radio frequencies emanating from electronic components 32 such as the printed circuit boards) is received and reflected away from the interior 24 of the antenna enclosure 22.

The EM shield 9 contains at least some conductive material (i.e. metal such as but not limited to electromagnetic tin) that is coupled to the ground 5 of the primary housing 5, so as to direct any absorbed EM radiation 101 as converted into electric current towards the ground 5. The EM shield 9 deals with the unwanted EM radiation 101 energy from the electronic components 32 directed/radiated towards the antenna 10 and therefore the affected (by the EM radiation 101 generated by the components 32) operation of the neighbouring antenna 10 is inhibited/reduced. It is recognised that also harmonics (second, third and fourth order, etc.) of the EM radiation 101 from the electronic components 32 can be inhibited (e.g. nullified or minimized) by the EM shield 9, once absorbed/reflected. Further, it is recognised that the dimensions of the EM shield 9, e.g. thickness, as well as the type of conductive material is optimized for all of the operational frequencies of the antenna 10 (e.g. 40 MHZ TO 5 GHZ, for example), so as to have selected impedance matching to absorb electromagnetic waves 101 at various selected frequencies depending on the dimensions and the type of conductive material used.

Position of the EM Shield

Referring to FIGS. 3,4, the position of the EM shield 9 in the portable terminal 8 is between the enclosure 22 and the enclosure 23. In particular, the entrance/opening 6 (at an interface 46 between the housings 22,23) to the enclosure 22 is covered or otherwise shielded by the EM shield 9 in order to intercept any EM radiation 101 of the electrical components 32 directed towards the enclosure 22. The EM shield 9 can be mounted on the enclosure 22 and/or the enclosure 23 so as to at least partially the entrance/opening 6 of the enclosure 22 in order to inhibit the propagation of EM radiation 101 generated by the electronic components 32 into the interior 42 of the enclosure 22 as EMI radiation 101. The mounting of the EM shield is done such that the conductive material of the EM shield 9 is coupled to the ground 5 by the coupling 44.

The conductive coupling 44 between the EM shield 9 and the ground 5 is for conducting any electrical current generated in the conductive material of the EM shield 9, due to interaction with the EM radiation 101 originating from the electrical components 32 that is directed towards the interior 24 of the enclosure 22, towards the ground 5. The conductive coupling 44 can be an electrically conductive gasket mounted between the housing 23 and the EM shield 9 such that the electrically conductive gasket is also connected to the ground 5 (e.g. via conductors such as wires between the gasket and the ground 5 and/or the ground 5 being one or more metal plates/elements as part of the housing 23), a plurality of fasteners for releasably securing the EM shield 9 to at least one of the housings/enclosures 22,23 that are electrically connected to the ground 5 (e.g. via conductors such as wires between the fasteners and the ground 5 and/or the ground 5 being one or more metal plates as part of the housing 23), and/or the EM shield is touching the ground 5 being one or more metal plates as part of the housing 23.

Figure 6:
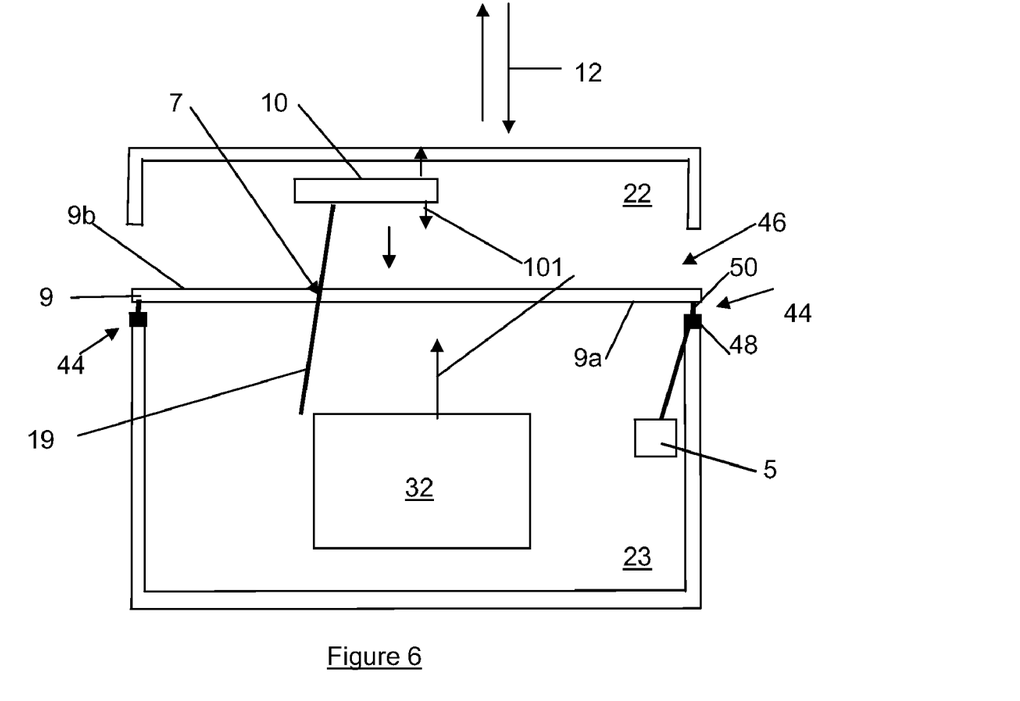
FIG. 6 is a further embodiment of the housing of FIG. 3.

Further, in the case where there are metallic elements 48 positioned on or otherwise part of the enclosure 23, see FIG. 6, the coupling 44 can be configured to include the electrical contact 48 (such as electrically conductive pads) connected to a resilient mating electrical contact 50 (e.g. pogo pins). The resilient electrical contacts 50 is configured to establish a releasably secure operative electrical connection between the EM shield 9 and the ground 5 (e.g. via metallic elements 48 of the housing 23).

Figure 5:
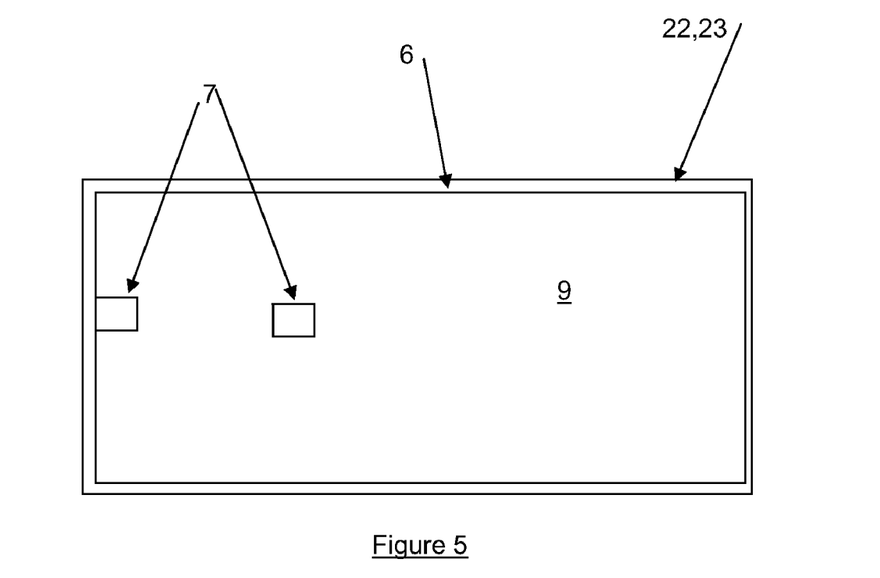
FIG. 5 is a diagram of an EM shield of the portable terminal of FIG. 1.

For example, the resilient electrical contacts 50 can be pogo pins in the form of a slender cylinder containing two spring-loaded pins, such that when pressed between the EM shield 9 and the housing 23, points at each end of the pogo pin make secure electrical contacts between the EM shield 9 and the housing 23 and thereby electrically connect them together with the ground 5. Further, an optional seal 52 (e.g. made of resilient electrically conductive material) can be positioned around a periphery of the entrance 6 of the enclosure 22,23 (e.g. see FIG. 5) as part of the coupling 44.

In any event, it is recognised that the electrical coupling 44 between the EM shield 9 and the ground 5 of the housing 23 can compensate for vibration/drop shock of the handheld terminal 8, such that the EM shield 9 can be connected to the housing 22, 23 using resilient connectors such as pogo pins, RF conductive gaskets 50, etc. The main importance for the resilient connection means 50 is that the coupling 44 maintains the RF grounded connection of the EM shield 9 to the main ground 5 of the housing 23 at all engineered times/conditions. Accordingly the connection means 50 maintains contact of the EM shield 9 with the main housing ground 5 while allowing for relative movement between the EM shield 9 and the housing 23 due to shock/vibration experienced by the portable terminal 8.

Therefore, the EM shield 9 and associated coupling 44 to the ground 5 of the portable terminal 8 addresses the problems encountered when exchanging different antennas 10 for mounting in the interior 24 of the enclosure 22, which can result in detuning of the swapped antennas 10 due to differences encountered in EM characteristics of handheld components 32 that generate EMI radiation 101 that can be experienced as undesirable feedback/interference of the different antenna 10 operation.

Accordingly, the EM shield 9 and associated coupling 44 provides for EM isolation/masking (e.g. creation of a common EM baseline) for the handheld components 32 as seen by the different antennas 10 and/or different antenna 10 and enclosure 22 configurations that can be assembled on the enclosure 23 of the portable handheld terminal 8. Therefore, the enclosure 22 and antenna 10 configuration can always see a consistent reference ground 5 as presented by the shielded electronic components 32 of the handheld 8. Therefore, the EM shield 9 can facilitate the rest of the handheld components 32 remaining EM "invisible" or otherwise consistent to the different antennas 10 and/or enclosure 22 and antenna 10 configurations mounted with respect to the housing 23 of the portable terminal 8.

Figure 7:
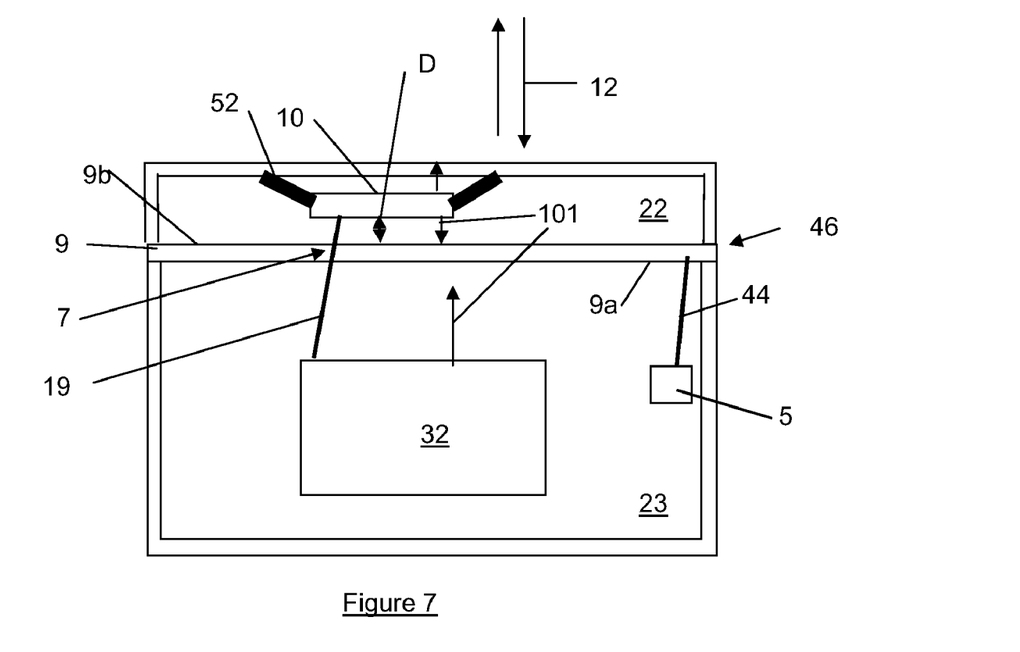
FIG. 7 is an assembled view of the housing of FIG. 4.

The parameters of the EM shield 9 can be such as but not limited to: location, thickness, type of ferromagnetic material, available space for the shield, number and size of holes 7 in the shield 9 for cabling 19, etc. Further, the antenna 10 is positioned in the enclosure 22 a defined distance D away from the EM shield 9, so as to limit the affect of the adjacent conductive material of the EM shield 9 on performance of the antenna 10. In other words, referring to FIG. 7, mounts 52 for the antenna 10 of the enclosure 22 are located in the interior 24 so as to position the antenna 10 a predefined distance D away from a surface 9b of the EM shield facing the antenna 10.

Advantages to use of the EM shield 9 and the coupling 44 is the provision of the components 32 as EM isolated from the antenna 10 or otherwise experienced as a consistent EM reference as seen by antenna 10 (e.g. the shield 9 rather than the components 32), thereby providing for consistent tuning and operational environments for the antennas 10. A further advantage is that by integrating the antenna 10 internally, the handheld's 8 dimensions (of the housing 21) and cost can be reduced while its ruggedness can be increased. Further, in being EM isolated or otherwise experiencing reduced EMI radiation 101 from the components 32, the antenna 10 can operate along with/simultaneously the handheld's 8 other included electronic technology without having adverse feedback problems between the antenna 10 and the other onboard communication components 32.

Example Assembly of the Portable Terminal 8

Figure 9:
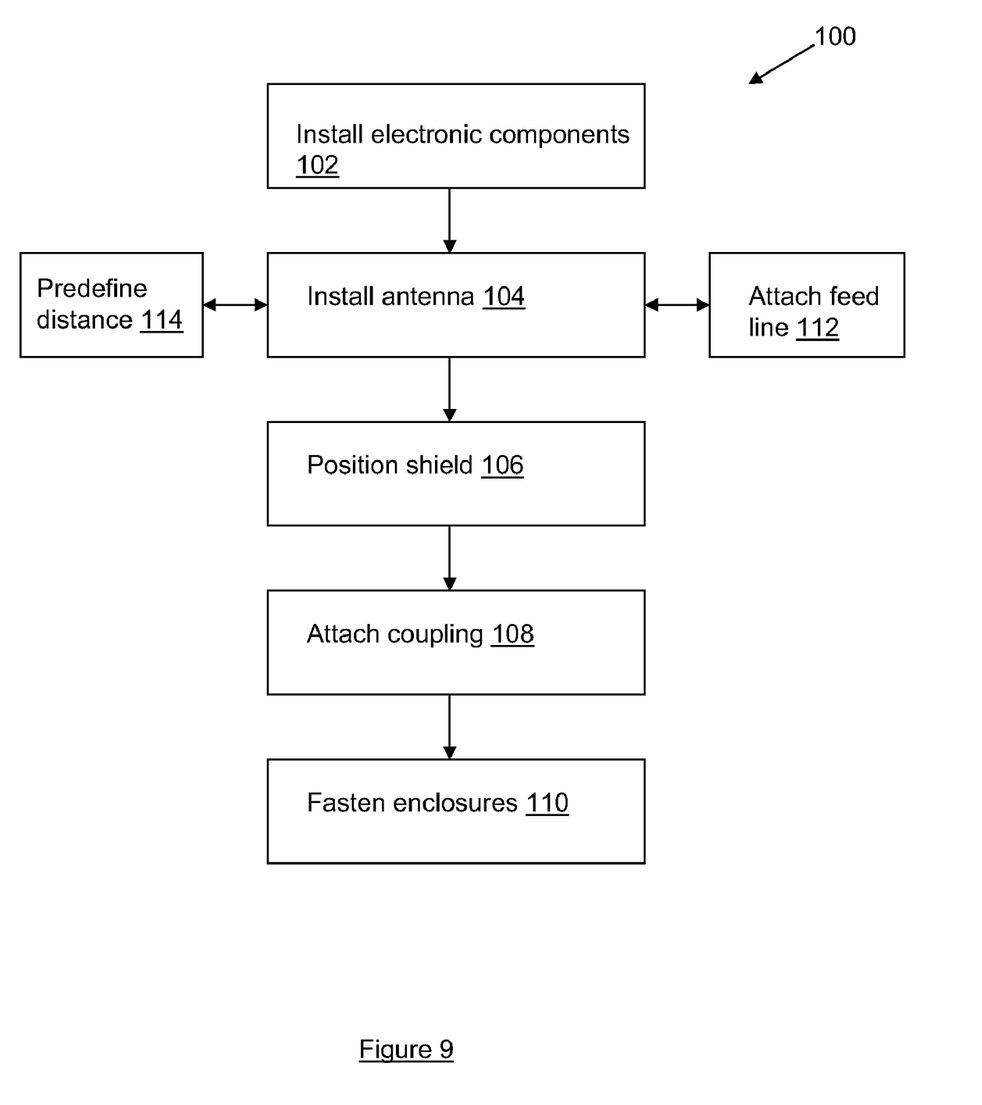
FIG. 9 is an example assembly method for the portable terminal of FIG. 1.

Referring to FIG. 9, shown is an example assembly method 100 for the portable terminal 8 of FIG. 3, the portable terminal 8 having a plurality of electronic components 32 and an antenna 10 such that at least a portion of the plurality of electronic components 32 and the antenna 10 are housed internally by a housing 21. At step 102, the assembler installs the plurality of electronic components in a first interior 31 of a first enclosure 23 of the housing 21, the first enclosure 23 having a ground 5. At step 104, the assembler installs the antenna in a second interior 24 of a second enclosure 22 of the housing 21, the second enclosure 22 for facilitating at least one of receiving or transmitting of EM signals 12 between the antenna 10 and an environment 4 external to the second enclosure 22. At step 106, the assembler positions a electromagnetic (EM) shield 9 at an interface 46 between the first interior 31 and the second interior 24, the EM shield 9 including electrically conductive material to absorb EM radiation 101 generated by the plurality of electronic components 32 being directed towards the antenna 10 and to convert the absorbed EM radiation 101 into electrical current and direct the electrical current towards the ground 5 of the first enclosure 23. At step 108, the assembler attaches an electrically conductive coupling 44 to the EM shield 9 for coupling the EM shield 9 to the ground 5 of the first enclosure 23; and at step 110, the assembler fastens (e.g. by mechanical fasteners such as screws, and/or by chemical attachment means such as adhesive) the second enclosure 22 and the first enclosure 23 to one another. A further step 112 is attaching a feed line 19 to connect at least one of a receiver or a transmitter 34 of the plurality of electrical components 32 to the antenna 10 (e.g. the feed line 19 passes through the interface 46 via a hole or slot 7 in the EM shield 9). A further step 114 is optionally mounting in the interior 24 of the second housing 22 the antenna 10 a predefined distance D away from a facing surface 9b of the EM shield 9.

It is also recognised that the EM shield 9 can be attached to the first enclosure 23 at the interface 46 prior to fastening the first enclosure 23 to the second enclosure 22. It is also recognised that the EM shield 9 can be coupled to the electrically conductive coupling 44 when the second enclosure 22 and the first enclosure 23 are fastened to one another.

We claim:

1. A portable terminal having a plurality of electronic components and an antenna such that at least a portion of the plurality of electronic components and the antenna are housed internally by a housing, the terminal comprising:
    a first enclosure of the housing having a first interior to contain the plurality of electronic components and a ground;
    a second enclosure of the housing for coupling to the first enclosure, the second enclosure having a second interior to contain the antenna and for facilitating at least one of receiving or transmitting of electromagnetic (EM) signals between the antenna and an environment external to the second enclosure;
    an EM shield positioned at an interface between the first interior and the second interior, the EM shield including electrically conductive material to absorb EM radiation generated by the plurality of electronic components being directed towards the antenna and to convert at least a portion of the absorbed EM radiation into electrical current and direct the electrical current towards the ground of the first enclosure;
    an electrically conductive coupling to couple the EM shield to the ground of the first enclosure; and
    a feed line connecting at least one of a receiver or a transmitter of the plurality of electrical components to the antenna, the feed line passing through the interface via a hole or slot in the EM shield.

2. The terminal of claim 1, wherein the electrically conductive coupling is a resilient coupling configured to maintain electrical contact between the ground and the EM shield in the event of mechanical vibration or shock delivered to the housing.

3. The terminal of claim 2, wherein the resilient coupling is an electrically conductive gasket.

4. The terminal of claim 2, wherein the resilient coupling is a metallic biased member.

5. The terminal of claim 1, wherein EM shield is mechanically attached to the first enclosure at the interface.

6. The terminal of claim 5, wherein EM shield is mechanically attached to the second enclosure at the interface.

7. The terminal of claim 1 further comprising mounts in the interior of the second housing for positioning the antenna a predefined distance away from a facing surface of the EM shield.

8. The terminal of claim 7, wherein the EM shield is selected from the group consisting of: a rigid plate and a flexible plate.

9. A method for assembling a portable terminal having a plurality of electronic components and an antenna such that at least a portion of the plurality of electronic components and the antenna are housed internally by a housing, the method comprising the steps of:
    installing the plurality of electronic components in a first interior of a first enclosure of the housing, the first enclosure having a ground;
    installing the antenna in a second interior of a second enclosure of the housing, the second enclosure for facilitating at least one of receiving or transmitting of electromagnetic (EM) signals between the antenna and an environment external to the second enclosure;
    positioning an EM shield at an interface between the first interior and the second interior, the EM shield including electrically conductive material to absorb EM radiation generated by the plurality of electronic components being directed towards the antenna and to convert at least a portion of the absorbed EM radiation into electrical current and direct the electrical current towards the ground of the first enclosure;
    attaching a feed line to connect at least one of a receiver or a transmitter of the plurality of electrical components to the antenna, the feed line passing through the interface via a hole or slot in the EM shield;
    attaching an electrically conductive coupling to the EM shield for coupling the EM shield to the ground of the first enclosure; and
    fastening the second enclosure and the first enclosure to one another.

10. The method of claim 9, wherein the electrically conductive coupling is a resilient coupling configured to maintain electrical contact between the ground and the EM shield in the event of mechanical vibration or shock delivered to the housing.

11. The method of claim 10, wherein the resilient coupling is an electrically conductive gasket.

12. The method of claim 10, wherein the resilient coupling is a metallic biased member.

13. The method of claim 9, wherein EM shield is mechanically attached to the first enclosure at the interface prior to fastening the first enclosure to the second enclosure.

14. The method of claim 13, wherein EM shield is coupled to the electrically conductive coupling when the second enclosure and the first enclosure are fastened to one another.

15. The method of claim 9 further comprising the step of mounting in the interior of the second housing the antenna in a predefined distance away from a facing surface of the EM shield.

16. The method of claim 15, wherein the EM shield is selected from the group consisting of: a rigid plate and a flexible plate.

* * * * *

UNITED STATES PATENT AND TRADEMARK OFFICE
CERTIFICATE OF CORRECTION

PATENT NO. : 8,339,807 B2  
APPLICATION NO. : 12/766066  
DATED : December 25, 2012  
INVENTOR(S) : Chirila et al.

Page 1 of 1

It is certified that error appears in the above-identified patent and that said Letters Patent is hereby corrected as shown below:

In the Specifications:

In Column 4, Line 38, delete "at lease" and insert -- at least --, therefor.

In Column 5, Line 63, delete "transceiver 32)." and insert -- transceiver 34). --, therefor.

In Column 6, Line 35, delete "Sand" and insert -- 5 and --, therefor.

In Column 6, Line 59, delete "UI devices 32" and insert -- electrical components 32 --, therefor.

Signed and Sealed this  
Twenty-third Day of April, 2013

Teresa Stanek Rea  
*Acting Director of the United States Patent and Trademark Office*